(12) United States Patent
Zhou et al.

(10) Patent No.: US 11,882,336 B2
(45) Date of Patent: Jan. 23, 2024

(54) METHOD AND SYSTEM FOR INTERACTION IN LIVE STREAMING

(71) Applicant: SHANGHAI BILIBILI TECHNOLOGY CO., LTD., Shanghai (CN)

(72) Inventors: Duona Zhou, Shanghai (CN); Yao Jiang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/881,165

(22) Filed: Aug. 4, 2022

(65) Prior Publication Data

US 2022/0377425 A1 Nov. 24, 2022

Related U.S. Application Data

(63) Continuation of application No. PCT/CN2020/133582, filed on Dec. 3, 2020.

(30) Foreign Application Priority Data

Feb. 11, 2020 (CN) .......................... 202010086321.3

(51) Int. Cl.
*H04N 21/478* (2011.01)
*H04N 21/2187* (2011.01)
(Continued)

(52) U.S. Cl.
CPC ..... *H04N 21/4781* (2013.01); *H04N 21/2187* (2013.01); *H04N 21/4784* (2013.01); *H04N 21/8545* (2013.01)

(58) Field of Classification Search
None
See application file for complete search history.

(56) References Cited

U.S. PATENT DOCUMENTS

| 11,388,453 B2 * | 7/2022 | Geng .................. H04N 21/488 |
| 2018/0255355 A1 | 9/2018 | Dharmaji | |

FOREIGN PATENT DOCUMENTS

| CN | 107680157 A | 2/2018 |
| CN | 107682729 A | 2/2018 |

(Continued)

OTHER PUBLICATIONS

International Patent Application No. PCT/CN2020/133582; Int'l Search Report; dated Jan. 29, 2021; 3 pages.

*Primary Examiner* — Omar S Parra
(74) *Attorney, Agent, or Firm* — BakerHostetler (57) ABSTRACT

This application discloses techniques of implementing interactions among live streamers and viewers. The techniques comprise in response to receiving an interaction request from a first client computing device associated with a first streamer, establishing a connection between the first client computing device and a second client computing device associated with a second streamer; obtaining a first video stream and a second video stream; generating an interactive video stream comprising the first video stream and the second video stream; sending the interactive video stream to a third client computing device associated with a viewer; detecting information received from the third client computing device, wherein the information comprises an interaction instruction; determining whether the interaction instruction is associated with the first video stream or the second video stream based on the received information; and causing to render the first video stream or the second video stream based on the interaction instruction.

20 Claims, 6 Drawing Sheets

(51) Int. Cl.
*H04N 21/4784* (2011.01)
*H04N 21/8545* (2011.01)

(56) References Cited

FOREIGN PATENT DOCUMENTS

| | | |
|---|---|---|
| CN | 108900920 A | 11/2018 |
| CN | 109068182 A | 12/2018 |
| CN | 109195003 A | 1/2019 |
| CN | 109327709 A | 2/2019 |
| CN | 110166786 A | 8/2019 |
| CN | 110166848 A | 8/2019 |
| CN | 110505491 A | 11/2019 |
| CN | 110519612 A | 11/2019 |
| WO | WO 2018/095174 A1 | 5/2018 |

* cited by examiner

METHOD AND SYSTEM FOR INTERACTION IN LIVE STREAMING

CROSS REFERENCE TO RELATED APPLICATION

The present application is a continuation of International Patent Application No. PCT/CN2020/133582, filed on Dec. 3, 2020, which claims priority to Chinese Patent Application No. 202010086321.3, titled "METHOD AND SYSTEM FOR INTERACTION IN LIVE STREAMING," filed on Feb. 11, 2020, both of which are incorporated herein by reference in their entireties.

BACKGROUND

With the development of live streaming technology, viewers can send gifts to the entertaining streamers or send barrages, and then the streamers respond to the gifts or barrages received. The existing techniques are relatively simple and gives the users less interaction experience in live streaming.

SUMMARY

The purpose of this application is to provide a method, system, computer device and readable storage medium for interaction in live streaming, which are used to solve the defects in the prior art that the streamers can only interact with viewers and the interaction way is limited.

One aspect of this application is providing a method for implementing interactions among live streamers and viewers, such method comprising in response to receiving an interaction request from a first client computing device associated with a first streamer, establishing a connection between the first client computing device and a second client computing device associated with a second streamer; obtaining a first video stream from the first client computing device and obtaining a second video stream from the second client computing device; generating an interactive video stream comprising the first video stream and the second video stream; sending the interactive video stream to a third client computing device associated with a viewer, wherein the viewer is any viewer of the interactive video stream; detecting whether information is received from the third client computing device associated with the viewer, wherein the information comprises an interaction instruction from the viewer; determining whether the interaction instruction is associated with the first video stream or the second video stream based on the information received from the third client computing device; and causing to render the first video stream or the second video stream based on the interaction instruction in response to determining that the interaction instruction is associated with the first video stream or the second video stream.

In order to achieve the above purpose, this application also provides a system for implementing interactions among live streamers and viewers, such system specifically comprising the following components: A connection module, configured to connect the first streamer client and the second streamer client according to the interaction request in live streaming when receiving it from the first streamer client; An acquisition module, configured to acquire a first video stream from the first streamer client, and acquire a second video stream from the second streamer client; A processing module, configured to splice the first video stream and the second video stream to obtain an interactive video stream, and sending the interactive video stream to the viewer client; A first detection module, configured to detect whether an interaction instruction is received from the viewer client; A first rendering module, configured to render the first video stream according to the interaction instruction on the first video stream when receiving such instruction to obtain a third video stream; The said processing module is further configured to splice the third video stream and the second video stream to obtain a target interactive video stream.

In order to achieve the above purpose, this application also provides a system for interaction in live streaming, such system specifically comprising the following components: A second detection module, configured to detect whether the interaction instruction sent by the viewer client is received; A second rendering module, configured to render the first video stream according to the interaction instruction on the first video stream when receiving such instruction to obtain a target video stream; A sending module, configured to send the target video stream to the server, so that the server splices the target video stream and the second video stream to obtain a third video stream.

In order to achieve the above purpose, this application also provides a computer device, such computer device specifically comprising: a memory, a processor, and computer-readable instructions stored on the memory and executable on the processor, the processor executes the computer-readable instructions to implement the steps of the method for interaction in live streaming as described above.

In order to achieve the above purpose, this application further provides a computer-readable storage medium on which computer-readable instructions are stored, and when the computer-readable instructions are executed by the processor, the steps of the method for interaction in live streaming as described above are implemented.

The method, system, computer device and readable storage medium for interaction in live streaming provided in this application will perform: when an request for interaction in live streaming is received from the first streamer client, connecting the first streamer client and the second streamer are connected based according to the request for interaction in live streaming; obtaining the first video stream from the first streamer client, and obtaining the second video stream from the second streamer client; splicing the first video stream and the second video stream to obtain an interactive video stream, and sending the interactive video stream to the viewer client; when an interaction instruction on the first video stream is received, the first video stream is rendered according to the interaction instruction to obtain a third video stream; splicing the third video stream with the second video stream to obtain a target interactive video stream, thus adding new ways of interaction between the streamers and viewers, and greatly increases the fun of interaction in live streaming.

BRIEF DESCRIPTION OF THE DRAWINGS

The detailed description of the following preferred embodiments makes various other advantages and benefits clearer to those of ordinary skill in this technical field. The figures are for the purpose of illustrating preferred embodiments only and are not to be deemed as limiting the scope of this application. In all the figures, the same components are denoted by the same reference symbols. In the figures.

DETAILED DESCRIPTION OF ILLUSTRATIVE EMBODIMENTS

In order to make the objectives, technical solutions and advantages of this application more clear, the present application is further described in detail below with reference to the accompanying figures and embodiments. It should be understood that the specific embodiments described herein are only used to explain this application, but not to limit this application. Based on the embodiments in this application, all other embodiments obtained by those of ordinary skill in this field without creative efforts shall fall within the protection scope of this application.

The method for interaction in live streaming provided in this application is described below with reference figures.

Figure 1:
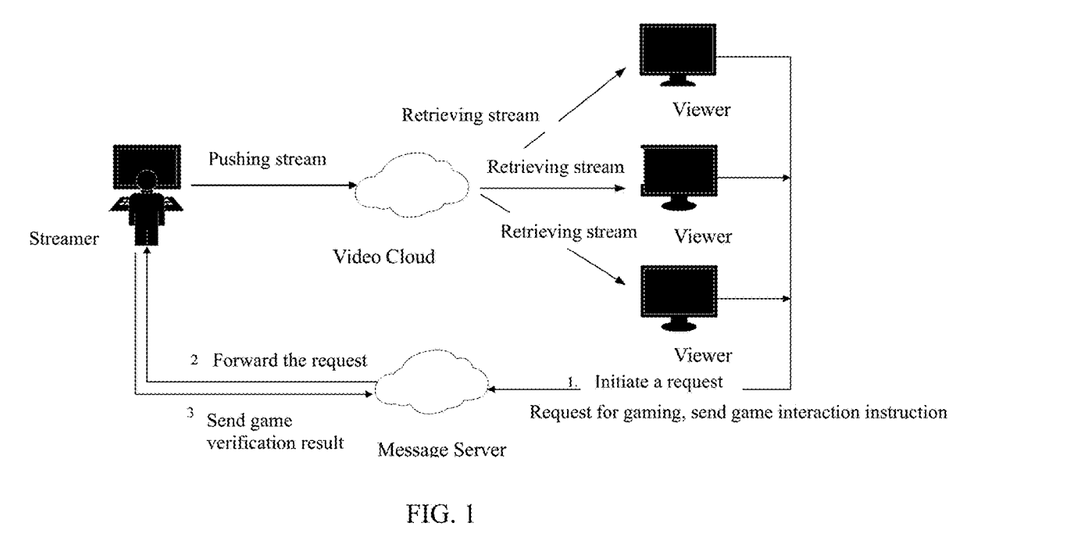
FIG. 1 is a schematic diagram of one optional working environment of the method for interaction in live streaming provided by this embodiment.

FIG. 1 is a schematic diagram of one optional working environment of the method for interaction in live streaming provided in this application. In FIG. 1, a streamer video captured by a camera is streamed to a video cloud through the streamer client, and then the viewer client retrieves the streamer video from the video cloud for watching. When the viewer wants to interact with the streamer in a game, a game interaction request instruction is sent to a message server which forwards the game interaction request instruction to the streamer client, so that the streamer can carry out a game interaction according to the game interaction request instruction. When the streamer completes the game interaction, the streamer client verifies the game interaction performance of the streamer, and sends the verification result to the message server, so that the message server can allocate virtual coins to the streamer or the viewer according to the verification result.

Figure 2:
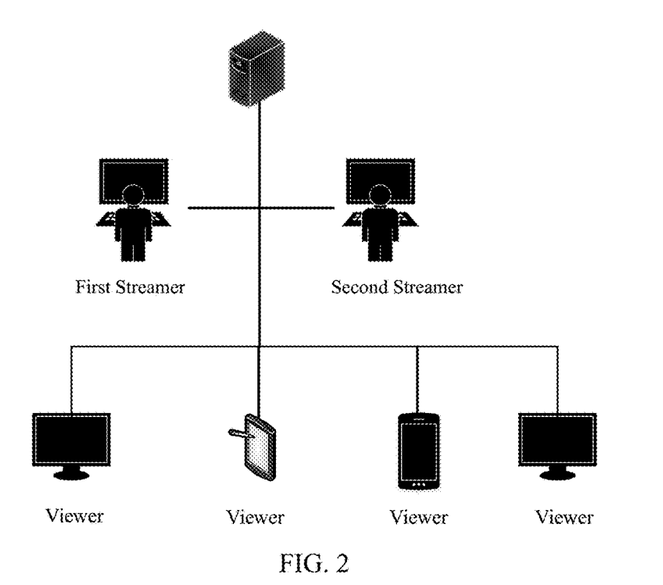
FIG. 2 is a schematic diagram of another optional working environment of the method for interaction in live streaming provided by this embodiment.

FIG. 2 is a schematic diagram of another optional working environment of the method for interaction in live streaming provided in this application. In FIG. 2, streamer A and streamer B battle with each other in a game. The server acquires the video streams of streamer A and streamer B, processes the video streams and sends them to the viewers of streamer A and streamer B. Viewers of streamer A and streamer B can perform corresponding operations to defend their own streamers, so as to realize the interaction between viewers and streamer A and streamer B. Of course, the viewers can interact with the streamers through various terminals such as a computer, a smart phone, or a pocket computer, which is not limited in the embodiments of this application.

Figure 3:
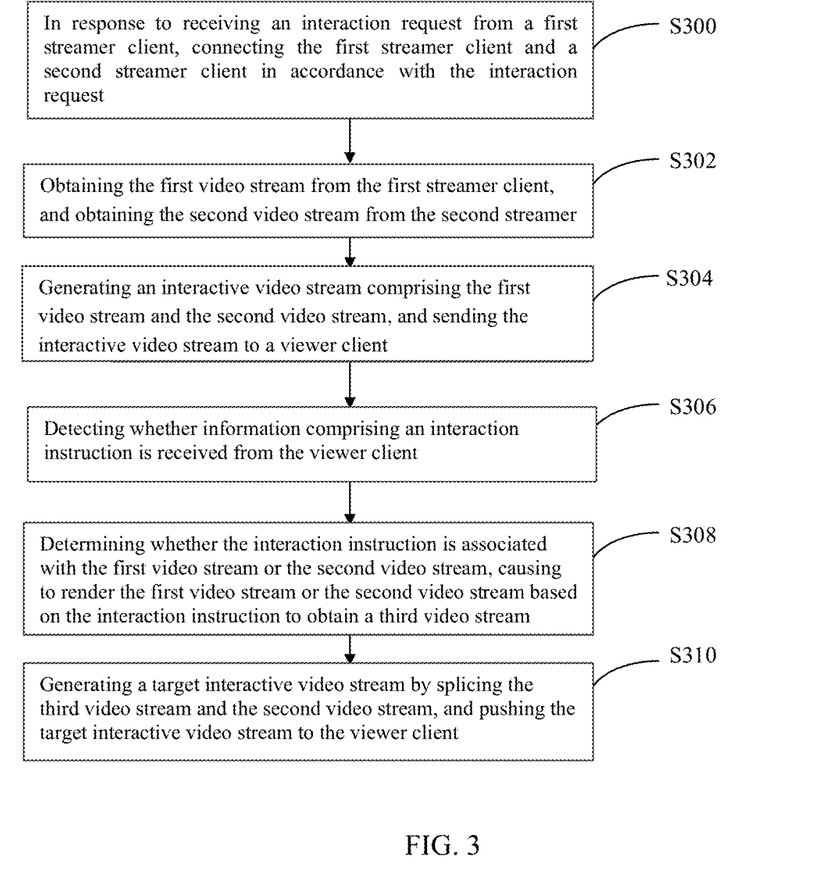
FIG. 3 is a schematic optional flowchart of the method for interaction in live streaming provided by this embodiment.

FIG. 3 is a schematic optional flowchart of the method for interaction in live streaming provided in this application. It can be understood that the flowchart in this embodiment of the method is not used to define the order of executing steps, and can be applied to a computer device. The computer equipment may be a mobile phone, a tablet personal computer, a laptop computer, a server, or other equipment with a data transmission function. In order to describe the embodiments of this application more clearly, with reference to FIG. 2, an exemplary description is given below with a server as an execution subject.

As shown in FIG. 3, the method specifically comprises operations S300 to S310.

Step S300: In response to receiving a request for interaction in live streaming from a first client computing device associated with a first streamer (i.e., a first streamer client), establish a connection between the first client computing device and a second client computing device associated with a second streamer (i.e., a second streamer client) based on the request for interaction in live streaming. The said request comprises information indicating a type of an interactive game and information indicating the second streamer who will play the interactive game with the first streamer.

Step S302: Acquire a first video stream from the first streamer client, and acquire a second video stream from the second streamer client.

Specifically, referring to FIG. 2, when a first streamer (for example: streamer A) is playing an interactive game in live streaming through the first streamer client, the server acquires the video stream from the first streamer client, the said video stream from the first streamer client is referred to as the first video stream in this embodiment. If the said streamer requests a battle challenge to a second streamer (for example, streamer B) in the streaming, the server also acquires the request for interaction in live streaming from the first streamer client, and according to the said request for interaction in live streaming, connect the first streamer client and the second streamer client of the second streamer (streamer B). Then, acquire the video stream from the second streamer client, and the said video stream from the first streamer client is referred to as the second video stream in this embodiment.

Step S304: Generate an interactive video stream comprising the first video stream and the second video stream, and send the interactive video stream to a third client computing device associated with a viewer (i.e., a viewer client). The viewer is any viewer of the interactive video stream.

Specifically, upon the establishment of connection between the first streamer client and the second streamer client, generate an interactive video stream by splicing the received first video stream of streamer A and the second video stream of streamer B. Then, the interactive video stream is pushed to the viewer client. Of course, in other embodiments, the spliced interactive video stream can also be pushed to the video cloud, and then each viewer client retrieves the spliced interactive video stream from the video cloud for the viewer to participate in the interaction between streamer A and streamer B. For example: supporting streamer A, or supporting streamer B.

Step S306: Detect whether information is received from the viewer client. The received information comprises an interaction instruction from the viewer.

Specifically, when the first streamer and the second streamer are competing, an interaction instruction sent by the viewer client is monitored in real time. The said interaction instruction comprises information indicating an object of interaction and a type of interaction to be carried out. For example: supporting or interfering with streamer A, or supporting or interfering with streamer B.

Step S308: Determine whether the interaction instruction is associated with the first video stream or the second video stream, causing to render the first video stream or the second video stream based on the interaction instruction to obtain a third video stream. For example, when the interaction instruction is associated with the first video stream, render the first video stream based on the interaction instruction to obtain a third video stream. In another example, when the interaction instruction is associated with the second video stream, render the second video stream based on the interaction instruction to obtain a third video stream.

Specifically, when the viewer sends an interaction instruction to the first streamer through the viewer client, render the first video stream uploaded by the first streamer client, so as to realize the support on or interference with the first streamer. The rendered first video stream is called the third video stream. For example, viewer A sends an interaction instruction to streamer A, where viewer A can support or interfere with streamer A, the server identifies the interaction instruction, and render the first video stream according to the interaction instruction to obtain the third video stream.

In the exemplary embodiment, when an interaction instruction is received from the viewer client, the interaction instruction is identified to determine the interactive operation to be performed on the first streamer or the second streamer. Where the instruction is identified as to perform on the second streamer, the second video stream is rendered, so as to realize the support on or interference with the second streamer.

Figure 4:
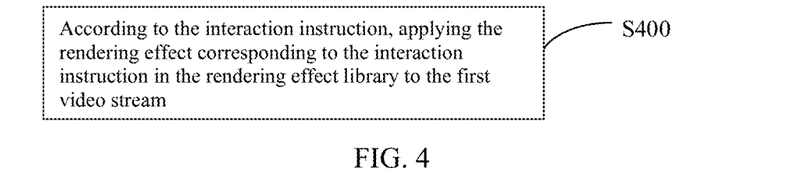
FIG. 4 is a schematic flowchart of an optional specific flow of step S308 in FIG. 3.

In the exemplary embodiment, as shown in FIG. 4, the step S308 may comprise step S400: according to the interaction instruction, render the first video stream with a preset rendering effect corresponding to the interaction instruction using the preset rendering effect library. The preset rendering effect library comprises a plurality of preset rendering effects configured to adjust difficulties of games. The interaction instruction includes level up (i.e., increase) or level down (i.e., decrease) a difficulty of a game. The preset rendering effect is configured to level up the difficulty of the game or configured to level down the difficulty of the game.

It should be noted that, each game is preset with various rendering effects in accordance with types of game in which the streamers compete, and each rendering effect corresponds to certain functions. For example: supporting a streamer corresponds to leveling the game difficulty of that streamer; or interfering with the streamer corresponds to leveling up the game difficulty of that streamer. By choosing a button, the viewer can interact with the corresponding streamer in the game. Each button corresponds to a streamer and the rendering effect on the video stream of that streamer. For example, button A is to level up/down the game difficulty of streamer A, and button B is to level up/down the game difficulty of streamer B. The operations corresponding to the said leveling down the game difficulty varies in accordance with the type of game. For example: sending protective props, killing candies of different colors, or triggering a button to level down the difficulty of the streamer. The operations corresponding to the said leveling up the game difficulty also varies in accordance with the type of game. For example: adding missiles, popping up candies of different colors, triggering the button to level up the difficulty of the competitor, or requesting a prescribed expression or action.

In the exemplary embodiment, each button may also correspond to a streamer, and upon receiving a button action from the viewer, determine the streamer whom the viewer intends to interact with in the game according to the button action. For example: interact with streamer A and adjust the level of game difficulty of streamer A. Then acquire the input operation of the viewer to determine the rendering effect on the stream of the corresponding streamer. For example, the viewer inputs a protective prop to defend streamer A, thereby leveling down the game difficulty of streamer A. Through this embodiment, the rendering effect of interaction in live streaming is greatly enriched, thereby increasing the fun of the game.

In the exemplary embodiment, when rendering the second video stream, upon the interaction instruction, the rendering effect corresponding to the interaction instruction in the preset rendering effect library is applied on the second video stream. For example: the viewer clicks button B, the server receives the interaction instruction from the viewer, identifies that the viewer intends to interfere with streamer B, and then the server applies the interference rendering effect to the video stream of streamer B (that is, the second video stream), to interfere with streamer B. By applying the corresponding rendering effect to the video stream, the game difficulty of the streamer is leveled up, which greatly improves the viewer's feel of participation and fun in the live streaming.

Step S310: Generate a target interactive video stream by splicing the third video stream and the second video stream, and push the target interactive video stream to the viewer client.

Specifically, when the video stream of the streamer corresponding to the viewer's interaction instruction (for example: streamer A) is rendered, splice the post-rendering third video stream with the second video stream of the render-free streamer (for example: streamer B), and push the target interactive video stream to the said viewer client. Through the embodiments of this application, during the game competition between two streamers, the viewers can participate in to adjust the game difficulty of their own streamers, so as to realize the interaction between the viewers and the streamer on their side and improve the viewers' feel of participation in the game.

In other exemplary embodiments, when the viewer of the first streamer sends an interaction instruction on the second streamer, the second video stream is rendered to level up the game difficulty of the second streamer. Then, the rendered second video stream and the first video stream are spliced, and the spliced target interactive video stream is sent to the viewer client. Through this embodiment, during the game competition between two streamers, the viewers can participate in to adjust the game difficulty of the competitive streamer, so as to realize the interaction between the viewers and the opponent streamer and improve the viewers' feel of participation in the game. Of course, the viewers of the first streamer can also change their side to support the second streamer and level down the game difficulty of the second streamer, which is not limited in this application.

Of course, in other exemplary embodiments, it can be determined through the button action whether the streamer that a viewer intends to interact with is on its own side or the other. Then, upon receiving the button action of the viewer, acquire the input operation of the viewer, so as to level up/down the game difficulty of the corresponding streamer and determine the rendering effect on the video stream of the corresponding streamer. For example, a button action can be identified as a request to streamer A or streamer B. When it is identified as a request to streamer B, the rendering effect corresponding to the button action is applied to the second video stream. Rendering effects include at least: sending protective props, killing candies of different colors, adding missiles, popping up candies of different colors, or prescribing a specified expression or action. The rendering effect can be arbitrarily set according to the game type to enrich the interactive display effect.

Figure 5:
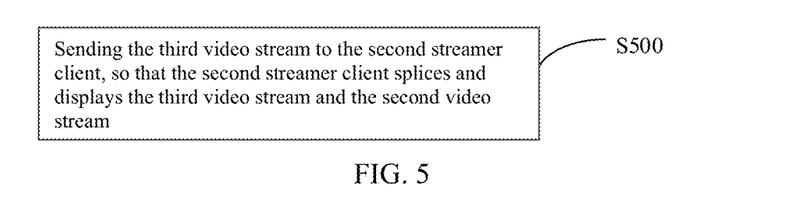
FIG. 5 is another schematic optional specific flowchart of the method for interaction in live streaming provided by this embodiment.

In the exemplary embodiment, as shown in FIG. 5, the said method may further comprise step S500.

Step S500: Send the third video stream to the second streamer client for the second streamer client to splice the third and second video streams and display it.

Specifically, after the server renders the video stream corresponding to the viewer's interaction instruction, the server sends the rendered video stream to the other streamer client, so that the rendered video stream and its own video stream are spliced together and displayed. Exemplarily, with reference to FIG. 2, if the server renders the first video stream of streamer A and sends the third video stream obtained after rendering to streamer B, streamer client B splices the third video stream and the second video stream of streamer B, and display it on the second streamer client. If the server renders the second video stream of streamer B and sends the rendered second video stream to streamer A, streamer client A splices the rendered second video stream and the first video stream of streamer A, and display it on the first streamer client. Though this embodiment, a streamer client can display the gaming status of the competing streamer in real time.

In the exemplary embodiment, after the video streams of the first streamer and the second streamer are spliced, the spliced interactive video stream is also rendered, so as to embed the game scores of the first and second streamers and the game tags; then, the target interactive video stream obtained after rendering is sent to the viewer client. In other exemplary embodiments, the server may also send the rendered target interactive video stream to the video cloud, so that the viewers can retrieve the target interactive video stream from the video cloud through the viewer client with the embedded game scores and the game tags. Through this embodiment, the visual effect of the interaction in live streaming is greatly improved, so that the viewers are fed with the game competition status of the streamers in real time when they are watching the live streaming.

Figure 6:
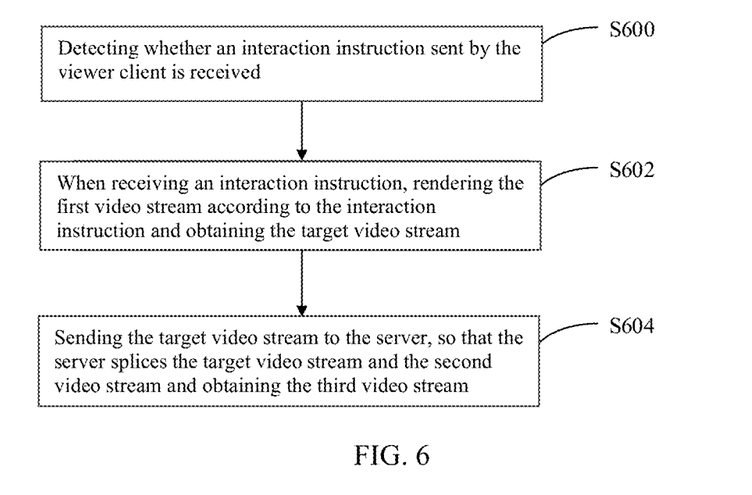
FIG. 6 is another schematic optional specific flowchart of the method for interaction in live streaming provided by this embodiment.

FIG. 6 another schematic optional specific flowchart of the method for interaction in live streaming provided in this application. It can be understood that the flowchart of the method in this embodiment is not used to limit the sequence of executing steps, and can be applied to a computer device. The computer device mentioned herein may be a mobile phone, a tablet personal computer, a laptop computer, a server, or other equipment with a data transmission function. In order to describe the embodiment of the method more clearly, with reference to FIG. 2, the flowchart of the embodiment of the method can be applied to the streamer client of streamer A or the streamer client of streamer B. The following only takes the streamer client of streamer A as the execution subject for exemplary description.

As shown in FIG. 6, the method specifically comprises steps S600 to S604.

Step S600: Detect whether an interaction instruction sent by the viewer client is received.

Specifically, when the streamer and his/her competitor are in the a game in live streaming detect the interaction instruction sent by the viewer client in real time which signifies whether the viewer is requesting an interaction. When an interaction instruction is detected, it means the viewer is requesting an interaction; otherwise, the viewer is not requesting an interaction.

It should be noted that the interaction instruction comprises the object of interaction and the type of interaction to be carried out. For example: supporting or interfering with streamer A, or supporting or interfering with streamer B. When the streamer client of streamer A receives an interaction instruction sent by the viewer client, it means that the viewer intends to support or interfere with streamer A.

Step S602: When the interaction instruction is received, the first video stream is rendered according to the interaction instruction to obtain a target video stream.

Specifically, when an interaction instruction sent by the viewer client is received, indicating that the viewer client is requesting for rendering on the first video stream, render the video stream corresponding to the interaction instruction (that is, the first video stream) and obtain the target video stream after rendering. For example, when streamer A's client receives an interaction instruction, it renders the video stream of streamer A (that is, the first video stream) and the first video stream after rendering is called the target video stream. For example, viewer A sends an interaction instruction to streamer A, where viewer A can support or interfere with streamer A, streamer A's client identifies the interaction instruction, and render the first video stream according to the interaction instruction to obtain the target video stream.

Figure 7:
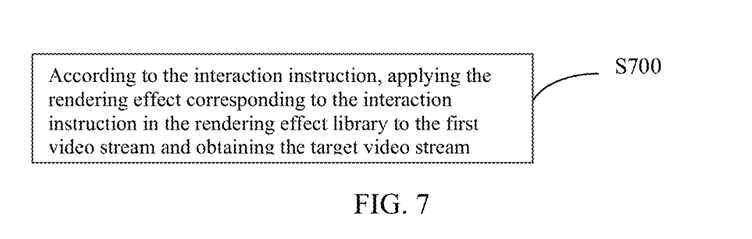
FIG. 7 is a schematic flowchart of an optional specific flow of step S602 in FIG. 6.

In the exemplary embodiment, as shown in FIG. 7, the step S602 may comprise step S700: according to the interaction instruction, render the first video stream with the rendering effect corresponding to the interaction instruction in the preset rendering effect library to obtain the target video stream, wherein the interaction instruction includes: leveling up/down the game difficulty, and the preset rendering effect library includes the rendering effects of leveling up/down the game difficulty.

It should be noted that, each game is preset with various rendering effects in accordance with the kind of game the streamers compete, and each rendering effect corresponds to certain functions. For example: supporting a streamer corresponds to leveling the game difficulty of that streamer; or interfering with the s streamer corresponds to leveling up the game difficulty of that streamer. By choosing a button, the viewer can interact with the corresponding streamer in the game. Each button corresponds to a streamer and the rendering effect on the video stream of that streamer. For example, button A is to level up/down the game difficulty of streamer A, and button B is to level up/down the game difficulty of streamer B. The operations corresponding to the said leveling down the game difficulty varies in accordance with the type of game. For example: sending protective props, killing candies of different colors, or triggering a button to level down the difficulty of the streamer. The operations corresponding to the said leveling up the game difficulty also varies in accordance with the type of game. For example: adding missiles, popping up candies of different colors, triggering the button to level up the difficulty of the competitor, or requesting a prescribed expression or action.

In another exemplary embodiment, each button corresponds to a streamer, and after receiving a button action from the viewer, a communication connection between the viewer client and streamer A's client is established. Then, acquire the input action of the viewer to determine the type of action chosen by the viewer. For example: the viewer inputs protection props to defend streamer A.

Step S604: Send the target video stream to the server, so that the server splices the target video stream and the second video stream to obtain a third video stream.

Specifically, after the video stream rendering of the anchor A is completed, the target video stream is sent to the server. Then, the server splices the target video stream and the received second video stream from streamer B, and obtains a third video stream after splicing. Finally, the server sends the third video stream to the viewer client. Of course, in other exemplary embodiments, the server may also push the third video stream to the video cloud, so that the viewer client can retrieve and display the third video stream from the video cloud. Through the embodiments of this application, during the game competition between two streamers, the game difficulty of a streamer can be adjusted in accordance with the viewer's input, so as to realize the interaction between the viewers and the streamers and improve the viewers' feel of participation in the game, and also the service load is effectively reduced.

Figure 8:
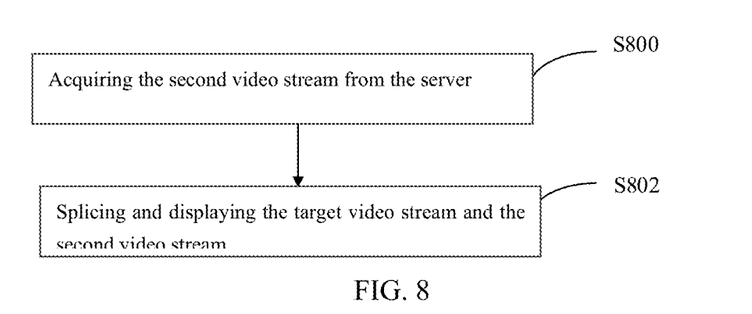
FIG. 8 is another schematic optional specific flowchart of the method for interaction in live streaming provided by this embodiment.

In the exemplary embodiment, with reference to FIG. 8, the method further comprises steps S800 and S802.

Step S800: Acquire the second video stream from the server.

Step S802: Splice and display the target video stream and the second video stream.

Specifically, after obtaining the target video stream, the second video stream of streamer B is also obtained from the server, and then the target video stream and the second video stream are spliced and displayed. Exemplarily, after the streamer A's client obtains the target video stream, it obtains the second video stream of streamer B from the server, and then the streamer A's client splices and displays the target video stream and the second video stream for streamer A to view the game status in real time.

In the exemplary embodiment, after the target video stream is sent to the server, the server further sends the target video stream to streamer B's client, so that streamer B's client sends splices and displays the target video stream and the second video stream. For example: referring to FIG. 2, after streamer A's client sends the target video stream to the server, the server sends the target video stream to the streamer B's client, and the streamer B's client splices and displays the target video stream and the second video stream for streamer B to view the game status in real time.

Of course, in order to reduce the server load, the streamer client corresponding to streamer A can directly send the target video stream to streamer B's client, corresponding to host A can also directly send the target video stream to the host B client, so that the streamer B's client can splice and display the target video stream and the second video stream.

In the exemplary embodiment, after splicing the video streams of streamer A and streamer B, the server further renders the spliced interactive video stream, so as to embed the game scores of streamer A and streamer B the game tags; then, the target interactive video stream obtained after rendering is sent to the viewer client. In other exemplary embodiments, the server may also send the rendered target interactive video stream to the video cloud, so that the viewers can retrieve the target interactive video stream from the video cloud through the viewer client with the embedded game scores and the game tags. Through this embodiment, the visual effect of the interaction in live streaming is greatly improved, so that the viewers are fed with the game competition status of the streamers in real time when they are watching the live streaming.

Figure 9:
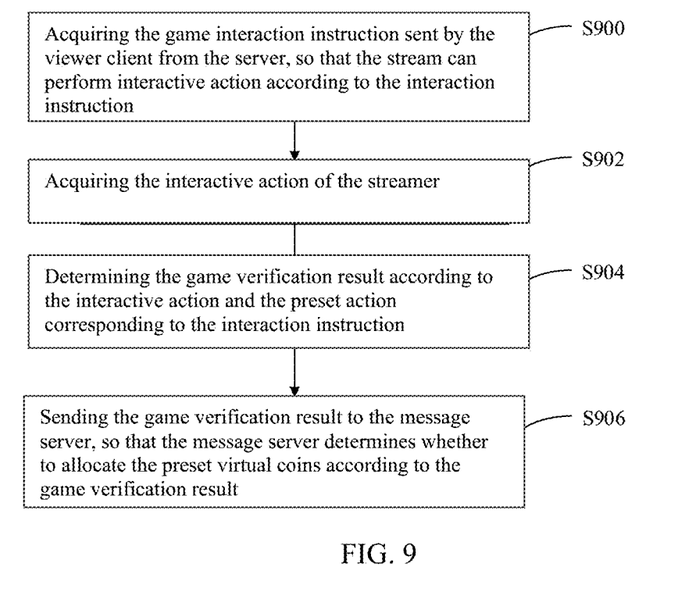
FIG. 9 is another schematic optional specific flowchart of the method for interaction in live streaming provided by this embodiment.

In the exemplary embodiment, as shown in FIG. 9, and referring to FIG. 1, the method may further comprise steps S900 to S906.

Step S900: Acquire the game interaction instruction sent by the viewer client from the message server, so that the streamer can interact according to the game interaction instruction, wherein the game interaction instruction corresponds to preset virtual coins.

Specifically, when a streamer is streaming, if a viewer inputs a game interactive action from the viewer client, the message server obtains the game interaction instruction from the viewer client, and sends it to the streamer client, so the streamer can perform the interaction in accordance with the game interaction instruction.

It should be noted that various types of game initiated by the viewers correspond to various amounts of virtual coins. For example: if a viewer initiates an interaction of feeding snacks, that action corresponds to a small amount of virtual coins, such as 3 coins; if the viewer initiates an interaction of Crazy Candy, it corresponds to a large amount of virtual coins, such as 10 coins. The types of game also include the following examples: the viewer pulls a smiling face to the designated position on the screen, the streamer shall smile at the designated position on the screen; the viewer pulls a blinking or lightning emoji to the designated position on the screen, and the streamer shall blink or make eye expression at the designated position on the screen. The game type can be set arbitrarily, the embodiment of this application does not limit the type of the game, and any kind of interactive game can be protected by the embodiment of this application. By setting a variety of game types, the fun of interaction in live streaming is greatly improved, and the view counts of live streaming increase.

Step S902: Acquire the interactive action of the streamer.

Specifically, when a viewer initiates an interactive action to the streamer, the streamer performs game interaction according to the received game interaction instruction. For example: when a viewer draws a circle on the screen, it means that the streamer shall move his/her face to the designated position within the preset time, and as the streamer moves his/her face or makes other actions, the said computer device acquires the movement of the streamer's face or other actions through the camera. When a viewer initiates the game of Crazy Candy, it means that the streamer shall play the same candy killing game within a specified time, and the said computer device acquires the interactive actions of the streamer through the camera.

Step S904: Obtain a game verification result according to the interactive actions and the preset actions corresponding to the game interaction instructions.

Specifically, compare the acquired interactive actions of the streamer with the preset actions corresponding to the game interaction instructions to verify the interactive actions of the streamer and obtain a game verification result, so as to determine the whether the streamer has performed the right actions.

Figure 10:
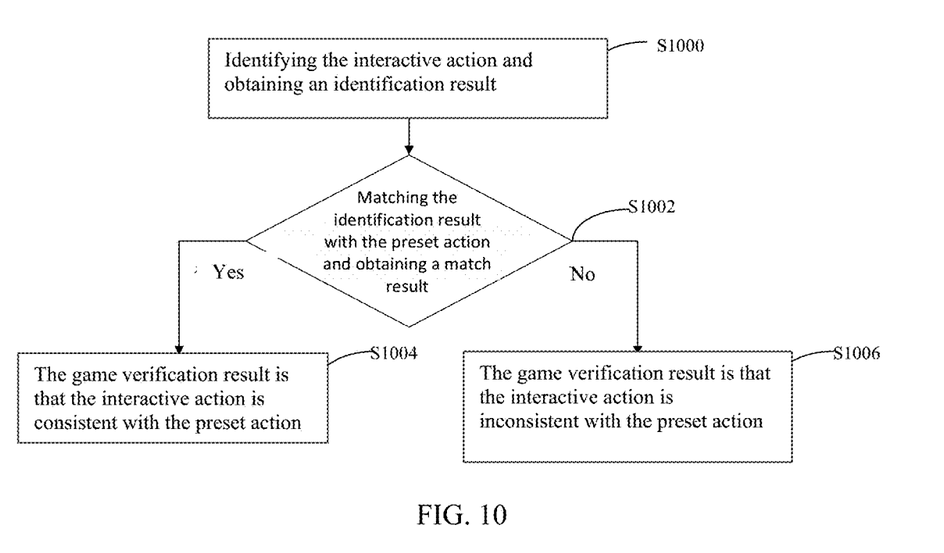
FIG. 10 is a schematic flowchart of an optional specific flow of step S904 in FIG. 9.

In the exemplary embodiment, as shown in FIG. 10, the step S904 may comprise steps S1000 to S1006.

Step S1000: Identify the interactive action, and obtain an identification result.

Specifically, when an interactive action of the streamer is acquired, identify such interactive action. For example, if the face of the streamer is detected within the preset time and at the designated position on the screen, the identification result is that the face is recognized within the preset time.

In the exemplary embodiment, the method may further comprise: acquiring a video stream of the streamer, and rendering the streamer to obtain a first target video stream.

Specifically, when the video stream of the streamer is acquired through the camera, the streamer is rendered, and the rendered video stream is called the first target video stream. Wherein, the mode of rendering the streamer is an asynchronous rendering mode. In the asynchronous rendering mode, only the anchor in the video stream is rendered, and no effects are applied to the rest part. In addition, before rendering the streamer, the streamer needs to be identified so as to recognize the streamer in the video stream, that is, to identify the human body features in the video stream. The said human body features could be the face, hand or other limbs. Various types of game identify various human body features. Through this embodiment, the rendering efficiency of the video stream can be accelerated.

Step S1002: Match the identification result with the preset action to obtain a matching result. If the matching result is that the identification result matches the preset action, perform step S1004; otherwise, perform step S1006.

Step S1004: The said game verification result is that the interactive action is consistent with the preset action.

Step S1006: The said game verification result is that the interactive action is inconsistent with the preset action.

Specifically, each game interaction instruction corresponds to a preset action. After the interactive action of the streamer is identified, match the identification result of the interactive action of the streamer with the preset action corresponding to the game interaction instruction. If the identification result is consistent with the preset action, the game verification result is that the interactive action is consistent with the preset action; otherwise, the game verification result is that the interactive action is inconsistent with the preset action.

It should be noted that the matching method in this embodiment may use fuzzy matching, for example: when the interactive action identified within the preset time is the streamer's face and the preset action is a preset face, although the two faces are of different facial features, they both are human faces. Through fuzzy matching, the result is that the identification result is consistent with the preset action. Through this embodiment, the interactive action of the streamer can be accurately verified, thereby promoting the interaction between the streamer and the viewer in live streaming.

In the exemplary embodiment, the method may further comprise the steps of: rendering the matching result in the first target video stream to obtain a second target video stream; pushing the second target video stream to the video cloud for the viewer client to retrieve it from the video cloud.

Specifically, upon completion of the match between the streamer's interactive action and the preset action, the corresponding matching result is rendered in the first target video stream, and the first target video stream after rendering is called the second target video stream which is sent to the viewer client. For example: when the matching result is that the identification result is consistent with the preset action, the rendering effect corresponding to a consistent result is rendered in the first target video stream; when the matching result is that the identification result is inconsistent with the preset action, the rendering effect corresponding to a inconsistent result is rendered in the first target video stream. Through this embodiment, the video stream of the streamer can be adaptively rendered according to the game matching result, thereby increasing the fun of interaction in live streaming and further promoting the interaction between the streamer and the viewers.

Step S906: Send the game verification result to the message server, so that the message server determines whether to allocate the preset virtual coins to the viewer and the streamer according to the game verification result.

In the exemplary embodiment, the step S906 determines whether to allocate the preset virtual coins to the viewer and the streamer according to the game verification result, which specifically comprises the steps:

Where the verification result is that the interactive action is consistent with the preset action, the preset virtual coins are allocated; where the game verification result is that the interactive action is inconsistent with the preset action, the preset virtual coins are not allocated, and the total virtual coins of the viewer and the total virtual coins of the streamer remain unchanged.

Specifically, where the verification result is that the interactive action is consistent with the preset action, it means that the steamer's interactive challenge is successful, and the preset virtual coins shall be allocated between the streamer and the viewer. Where the verification result is that the interactive action is inconsistent with the preset action, it means that the steamer's interactive challenge fails, and the preset virtual coins shall not be allocated between the streamer and the viewer. For example: if the verification result is that the streamer moved his/her face to the designated position within the preset time, the streamer succeeded in the interactive challenge, and the preset virtual coins are allocated between the streamer and the viewer; otherwise, the coins are no to be allocated. Through this embodiment, the allocation of virtual coins is made possible, thereby promoting the enthusiasm of the streamer in live streaming.

In the exemplary embodiment, where the verification result is that the interactive action is consistent with the preset action, the preset virtual coins are allocated, through the following steps:

The preset virtual coins are deducted from the viewer's total virtual coins; the preset virtual coins are added to the streamer's total virtual coins.

Specifically, when the preset virtual coins are to be allocated, it means that the streamer succeeded in the interactive challenge, the viewer consumes the preset virtual coins, and the streamer gains the preset virtual coins. Of course, when the audience initiates a game interaction, it is necessary to compare the viewer's total virtual coins with the preset virtual coins corresponding to the game type selected by the viewer. Where the viewer's total virtual coins are less than the preset virtual coins, the viewer fails to initiate the game interaction, and the streamer will not receive the game interaction instruction from the message server sent by the client of the viewer. This embodiment promotes the consumption of virtual coins and improves the traffic of live streaming.

Of course, in the exemplary embodiment, in order to promote the interaction of viewers, a viewer may also choose to interact with a virtual streamer. Specifically, the viewer chooses an interactive button with the virtual streamer, and then selects the corresponding rendering effect to render on the interface of the virtual streamer. For example: select the rendering effect of dressing up, the virtual streamer will change the corresponding dress; select the rendering effect of feeding cake, then feed the virtual streamer with a cake; select the caress icon, then caress the virtual streamer; select the touch icon, then touch the virtual streamer.

Figure 11:
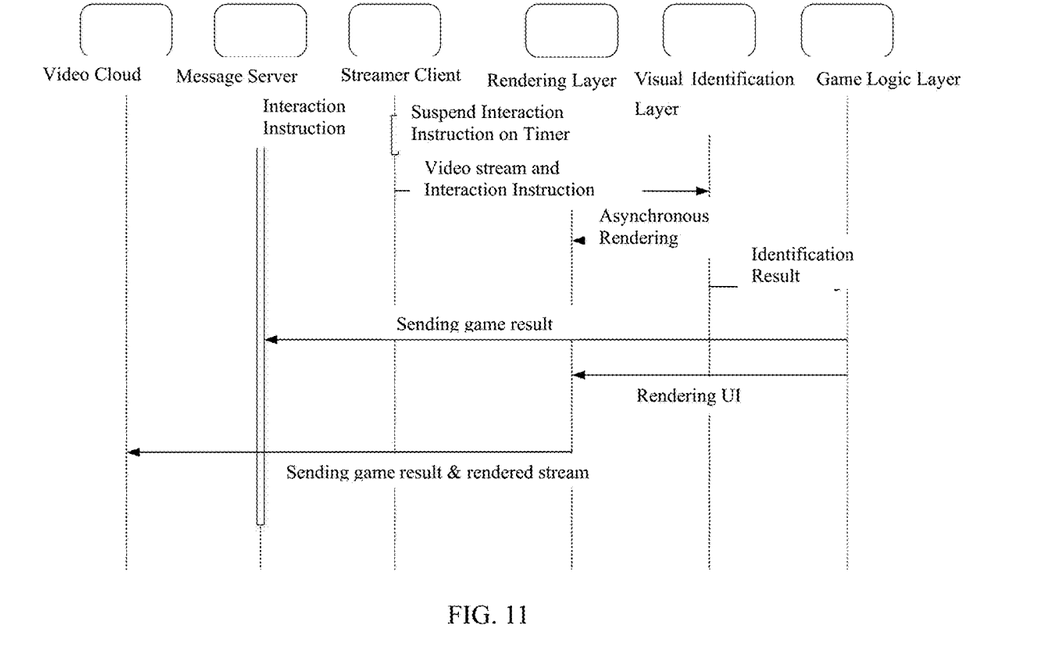
FIG. 11 is a schematic diagram of an optional work flow of the method for interaction in live streaming provided by this embodiment.

FIG. 11 is a schematic diagram of an optional work flow of the method for interaction in live streaming provided by this embodiment. In FIG. 11, when the streamer client receives a game interaction instruction sent by the viewer, the image recognition layer identifies the streamer, and the rendering layer renders the streamer by asynchronous rendering method according to the identification result, and recognizes the game interaction instruction and the human body features of the streamer, and then judges the game instruction and the identification result of the streamer's human body features in the game logic layer to determine whether the streamer's action is correct and obtain the game result. The game logic layer sends the game result to the message server. The rendering layer also renders the video stream of the streamer according to the game result, and sends the rendered video stream and the game result to the video cloud.

With the method for interaction in live streaming provided by the embodiment in this application, first obtain the game interaction instruction from the message server sent by the viewer client, so that the streamer performs an interactive action according to the game interaction instruction, then the interactive action of the streamer of the anchor is acquired. Then the game verification result is determined according to the interactive action and the preset interactive action corresponding to the game interaction instruction, and the game verification result is sent to the message server for the server to determine whether the preset virtual coins are to be allocated between the streamer and the viewer or not according to the game verification result. It promotes the interaction between the streamer and the viewers and the traffic of live streaming.

Figure 12:
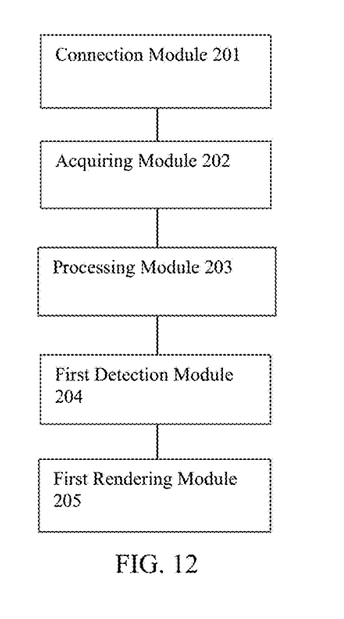
FIG. 12 is a schematic diagram of an optional program module combination of the method for interaction in live streaming provided by this embodiment.

Based on the method for interaction in live streaming provided in the above-mentioned embodiments, a system for interaction in live streaming is provided in this embodiment, and such system can be applied to computer equipment. Specifically, FIG. 12 shows an optional structural block diagram of the system for interaction in live streaming which is divided into one or multiple program modules. The one or multiple program modules are stored in a storage medium, and are executed by one or multiple processors to complete this application. A program module referred to in this application refers to a series of computer-readable instruction segments capable of accomplishing specific functions, and is more suitable for describing the execution process of the system for interaction in live streaming in the storage medium than a program itself. The following illustration will specifically describe the functions of each program module in this embodiment.

As shown in FIG. 12, the system for interaction in live streaming specifically comprises the following components:

The connection module 201, configured to connect the first streamer client and the second streamer client based on the live interaction request when receiving it from the first streamer client. The said live interaction request comprises the type of the interactive game and the second streamer who competes with the first streamer in the interactive game.

The acquiring module 202, configured to acquire the first video stream from the first streamer client, and acquire the second video stream from the second streamer client.

The processing module 203, configured to splice the first video stream and the second video stream to obtain an interactive video stream, and sending such interactive video stream to the viewer client.

The first detection module 204, configured to detect whether an interaction instruction is received from the viewer client.

The first rendering module 205, configured to render the first video stream according to the interaction instruction upon receiving it, to obtain the third video stream.

In the exemplary embodiment, the first rendering module 205 is further configured to render the rendering effect corresponding to the interaction instruction in the preset rendering effect library to the first video stream according to the interaction instruction, wherein the said interaction instruction includes leveling up/down the game difficulty, and the preset rendering effect library includes the rendering effect of leveling up game difficulty and the rendering effect of leveling down the game difficulty.

The said processing module 203 is further configured to splicing the third video stream and the second video stream to obtain a target interactive video stream.

Figure 13:
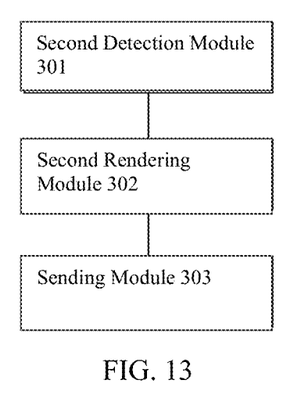
FIG. 13 is a schematic diagram of another optional program module combination of the method for interaction in live streaming provided by this embodiment.

Based on the method for interaction in live streaming provided in the above-mentioned embodiments, a system for interaction in live streaming is provided in this embodiment, and such system can be applied to computer equipment. Specifically, FIG. 13 shows an optional structural block diagram of the system for interaction in live streaming which is divided into one or multiple program modules. The one or multiple program modules are stored in a storage medium, and are executed by one or multiple processors to complete this application. A program module referred to in this application refers to a series of computer-readable instruction segments capable of accomplishing specific functions, and is more suitable for describing the execution process of the system for interaction in live streaming in the storage medium than a program itself. The following illustration will specifically describe the functions of each program module in this embodiment.

As shown in FIG. 13, the system for interaction in live streaming specifically comprises the following components:

The second detection module 401, configured to detect whether an interaction instruction is received from the viewer client.

The second rendering module 402, configured to render the first video stream according to the interaction instruction upon receiving it, to obtain the target video stream.

In the exemplary embodiment, the second rendering module 402 is further configured to render the rendering effect corresponding to the interaction instruction in the preset rendering effect library to the first video stream according to the interaction instruction, and obtain the target video stream, wherein the said interaction instruction includes leveling up/down the game difficulty, and the preset rendering effect library includes the rendering effect of leveling up the game difficulty and the rendering effect of leveling down the game difficulty.

The sending module 403, configured to send the target video stream to the server, so that the server splices the target video stream and the second video stream to obtain the third video stream.

In the exemplary embodiment, referring to FIG. 1, the system for interaction in live streaming may further comprise:

The second acquiring unit, configured to acquire the game interaction instruction from the message server sent by the viewer client, so that the streamer can perform interactive action according to the game interaction instruction, wherein the game interaction instruction corresponds to preset virtual coins.

The second acquiring unit is further configured to obtain the interactive action of the streamer.

The determining unit, configured to determine the game verification result according to the interactive action and the preset action corresponding to the game interaction instruction.

In the exemplary embodiment, the determining unit is specifically configured to:

Identify the said interactive action, and obtain an identification result; match the identification result with the preset action to obtain a matching result, and if the matching result is that the identification result matches the preset action, determine the game verification result is that the interactive action is consistent with the preset action; otherwise, determine that the game verification result is that the interactive action is inconsistent with the preset action.

In the exemplary embodiment, the processing unit is further configured to: acquire the video stream of the streamer, and render the streamer to obtain the first target video stream.

In the exemplary embodiment, the processing unit is further configured to: render the matching result in the first target video stream to obtain the second target video stream; push the second target video stream to the video cloud for the viewer client to retrieve it from the video cloud.

The said sending module 403 is further configured to send the game verification result to the message server, so that the message server can determine whether to allocate the preset virtual coins between the viewer and the streamer according to the game verification result.

The live interactive method provided by the embodiment of the present application firstly detects whether an interactive operation instruction sent by the viewer client is received, and when the interactive operation instruction is received, the first video stream is rendered according to the interactive operation instruction, to obtain the target video stream, and then send the target video stream to the server, so that the server splices the target video stream and the second video stream to obtain a third video stream. In addition to the live broadcast interaction between the anchor and the audience, the live broadcast traffic of the video is increased.

With the method for interaction in live streaming provided by the embodiment in this application, first detect the interaction instruction sent by the viewer client, if an interaction instruction is received, render the first video stream according to the interaction instruction to obtain the target video stream. Then send the target video stream to the server, so that the server splices the target video stream and the second video stream to obtain the third video stream. This method promotes the interaction between the streamer and the viewers and the traffic of live streaming.

Figure 14:
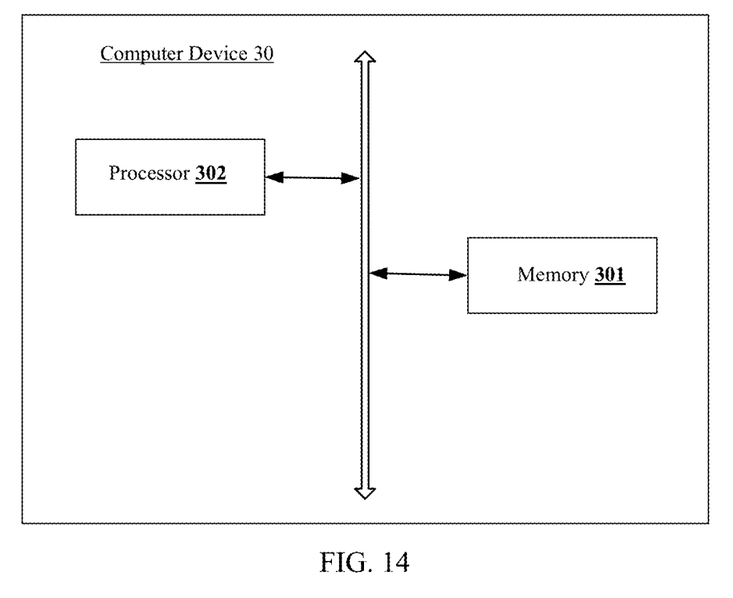
FIG. 14 is a schematic diagram of an optional hardware architecture of a computer device provided by this embodiment.

This embodiment also provides a computer device, such as a smart phone, a tablet computer, a notebook computer, a desktop computer, a rack server, a blade server, a tower server, or a cabinet server (including independent servers, or a server cluster composed of multiple servers), etc. As shown in FIG. 14, the computer device 30 in this embodiment comprises at least but is not limited to: a memory 301 and a processor 302 that can be communicate with each other through a system bus connection. It should be noted that FIG. 14 shows only the computer device 30 comprising 301-302, but it should be understood that not every component is required in implementation, and more or less components may be implemented instead.

In this embodiment, the memory 301 (that is, a readable storage medium) may be a flash memory, a hard disk, a multimedia card, a card-type memory (eg, SD or DX memory, etc.), random access memory (RAM), static random access memory (SRAM), Read Only Memory (ROM), Electrically Erasable Programmable Read Only Memory (EEPROM), Programmable Read Only Memory (PROM), Magnetic Memory, Magnetic Disk, Optical Disc, etc. In some embodiments, the memory 301 may be an internal storage unit of the computer device 30, such as a hard disk or a memory of the computer device 30. In other embodiments, the memory 301 may also be an external storage device of the computer device 30, such as a plug-in hard disk, a Smart Media Card (SMC), a Secure Digital (SD) card, a Flash Card, etc. Of course, the memory 301 may also comprise both the internal storage unit of the computer device 30 and its external storage device. In this embodiment, the memory 301 is generally used to store the operating system and various application software installed on the computer device 30, such as the program codes of the system for interaction in live streaming in the above-mentioned embodiment. In addition, the memory 301 can also be used to temporarily store various types of data that have been output or will be output.

The processor 302 may be a Central Processing Unit (CPU), a controller, a microcontroller, a microprocessor, or other data processing chips in some embodiments. The processor 302 is typically configured to control the overall operation of the computer device 30.

Specifically, in this embodiment, the processor 302 is configured to execute the program of the method for interaction in live streaming which is stored in the processor 302, and the following steps are performed when the program is executed:

When receiving an interaction request from the first streamer client, connect the first streamer client and the second streamer client in accordance with the interaction request;

Obtain the first video stream from the first streamer client, and obtain the second video stream from the second streamer client;

Splice the first video stream and the second video stream to obtain an interactive video stream, and send the interactive video stream to the viewer client;

Detect whether an interaction instruction is received from the viewer client;

When receiving an interaction instruction on the first video stream, render the first video stream according to the interaction instruction to obtain a third video stream;

Splice the third video stream and the second video stream to obtain a target interactive video stream.

The specific embodiment process of the above-mentioned steps may be referred to the above embodiment, and details are not repeated here in this embodiment.

This embodiment also provides a computer device, such as a smart phone, a tablet computer, a notebook computer, a desktop computer, a rack server, a blade server, a tower server, or a cabinet server (including independent servers, or a server cluster composed of multiple servers), etc. As shown in FIG. 14, the computer device 30 in this embodiment comprises at least but is not limited to: a memory 301 and a processor 302 that can be communicate with each other through a system bus connection. It should be noted that FIG. 14 shows only the computer device 30 comprising 301-302, but it should be understood that not every component is required in implementation, and more or less components may be implemented instead.

In this embodiment, the memory 301 (that is, a readable storage medium) may be a flash memory, a hard disk, a multimedia card, a card-type memory (eg, SD or DX memory, etc.), random access memory (RAM), static random access memory (SRAM), Read Only Memory (ROM), Electrically Erasable Programmable Read Only Memory (EEPROM), Programmable Read Only Memory (PROM), Magnetic Memory, Magnetic Disk, Optical Disc, etc. In some embodiments, the memory 301 may be an internal storage unit of the computer device 30, such as a hard disk or a memory of the computer device 30. In other embodiments, the memory 301 may also be an external storage device of the computer device 30, such as a plug-in hard disk, a Smart Media Card (SMC), a Secure Digital (SD) card, a Flash Card, etc. Of course, the memory 301 may also comprise both the internal storage unit of the computer device 30 and its external storage device. In this embodiment, the memory 301 is generally used to store the operating system and various application software installed on the computer device 30, such as the program codes of the system for interaction in live streaming in the above-mentioned embodiment. In addition, the memory 301 can also be used to temporarily store various types of data that have been output or will be output.

The processor 302 may be a Central Processing Unit (CPU), a controller, a microcontroller, a microprocessor, or other data processing chips in some embodiments. The processor 302 is typically configured to control the overall operation of the computer device 30.

Specifically, in this embodiment, the processor 302 is configured to execute the program of the method for interaction in live streaming which is stored in the processor 302, and the following steps are performed when the program is executed:

When receiving an interaction request from the first streamer client, connect the first streamer client and the second streamer client in accordance with the interaction request;

Obtain the first video stream from the first streamer client, and obtain the second video stream from the second streamer client;

Splice the first video stream and the second video stream to obtain an interactive video stream, and sending the interactive video stream to the viewer client;

Detect whether an interaction instruction is received from the viewer client;

When receiving an interaction instruction on the first video stream, render the first video stream according to the interaction instruction to obtain a third video stream;

Splice the third video stream and the second video stream to obtain a target interactive video stream.

The specific embodiment process of the above-mentioned steps may be referred to the above embodiment, and details are not repeated here in this embodiment.

This embodiment also provides a computer-readable storage medium, such as a flash memory, a hard disk, a multimedia card, a card-type memory (eg, SD or DX memory, etc.), random access memory (RAM), static random access memory (SRAM), only Read-Only Memory (ROM), Electrically Erasable Read-Only Memory (EEPROM), Programmable Read-Only Memory (PROM), Magnetic Memory, Disk, Optical Disc, Server, App Store, etc., on which the computer-readable instructions are stored, and the following steps are performed when the computer-readable instructions are executed by the processor:

When receiving an interaction request from the first streamer client, connect the first streamer client and the second streamer client in accordance with the interaction request;

Obtain the first video stream from the first streamer client, and obtain the second video stream from the second streamer client;

Splice the first video stream and the second video stream to obtain an interactive video stream, and sending the interactive video stream to the viewer client;

Detect whether an interaction instruction is received from the viewer client;

When receiving an interaction instruction on the first video stream, render the first video stream according to the interaction instruction to obtain a third video stream;

Splice the third video stream and the second video stream to obtain a target interactive video stream.

The specific embodiment process of the above-mentioned steps may be referred to the above embodiment, and details are not repeated here in this embodiment.

This embodiment further provides a computer-readable storage medium, such as a flash memory, a hard disk, a multimedia card, a card-type memory (eg, SD or DX memory, etc.), random access memory (RAM), static random access memory (SRAM), only Read-Only Memory (ROM), Electrically Erasable Programmable Read-Only Memory (EEPROM), Programmable Read-Only Memory (PROM), Magnetic Memory, Disk, Optical Disc, Server, App Store, etc., on which the computer-readable instructions are stored, and the following steps are performed when the computer-readable instructions are executed by the processor:

Detect whether an interaction instruction sent by the viewer client is received;

When receiving an interaction instruction, render the first video stream according to the interaction instruction to obtain the target video stream;

Send the target video stream to the server, so that the server splices the target video stream and the second video stream to obtain the third video stream.

The specific embodiment process of the above-mentioned steps may be referred to the above embodiment, and details are not repeated here in this embodiment.

It should be noted that, herein, the terms "including", "comprising" or any other variation thereof are intended to encompass non-exclusive inclusion, such that a process, method, article or device comprising a series of elements comprises not only those elements, it also comprises other elements not expressly listed or inherent to such a process, method, article or device. Without further limitation, an element qualified by the phrase "including a . . . " does not preclude the presence of additional identical elements in a process, method, article or device that comprises the element.

The above-mentioned serial numbers of the embodiments of this application are only for description, and do not represent the advantages or disadvantages of the embodiments.

From the description of the above embodiments, those skilled in the field can clearly understand that the methods of the above embodiments can be implemented by means of software plus a necessary general hardware platform, and of course as well as by means of hardware only, but in many cases the former is better implementation.

The above are only the preferred embodiments of this application, and are not intended to limit the scope of the patent of this application. Any equivalent structure or equivalent process transformation made by using the contents of the description and drawings of this application, or directly or indirectly applied in other related technical fields, are similarly included within the scope of patent protection of this application.

What is claimed is:

1. A method of implementing interactions among live streamers and viewers, comprising:
   in response to receiving an interaction request from a first client computing device associated with a first streamer, establishing a connection between the first client computing device and a second client computing device associated with a second streamer based on the interaction request;
   obtaining a first video stream from the first client computing device and obtaining a second video stream from the second client computing device;
   generating an interactive video stream, the interactive video stream comprising the first video stream and the second video stream;
   sending the interactive video stream to a third client computing device associated with a viewer, wherein the viewer is any viewer of the interactive video stream;
   detecting whether information is received from the third client computing device associated with the viewer, wherein the information comprises an interaction instruction from the viewer;
   determining whether the interaction instruction is associated with the first video stream or the second video stream based on the information received from the third client computing device;
   in response to determining that the interaction instruction is associated with the first video stream, causing to render the first video stream based on the interaction instruction; and
   in response to determining that the interaction instruction is associated with the second video stream, causing to render the second video stream based on the interaction instruction.

2. The method of claim 1, wherein the interaction request comprises information indicating a type of a game and information indicating the second streamer with whom the first streamer will compete in the game.

3. The method of claim 1, further comprising:
   determining a preset rendering effect corresponding to the interaction instruction using a preset rendering effect library, wherein the preset rendering effect library comprises a plurality of preset rendering effects configured to adjust difficulties of games; and
   applying the preset rendering effect to the first video stream or the second video stream, wherein the interaction instruction is indicative of decreasing or increasing a difficulty of a game in which the first streamer and the second streamer are competing, and wherein the preset rendering effect is configured to decrease or increase the difficulty of the game.

4. The method of claim 1, further comprising:
   obtaining a third video stream by causing to render one of the first video stream or the second video stream based on the interaction instruction;
   generating a target interactive video stream by splicing the third video and another among the second video stream or the first video stream; and
   pushing the target interactive video stream to the third computing device associated with the viewer for display.

5. The method of claim 1, further comprising
   acquiring a second interaction instruction sent from the viewer, wherein the second interaction instruction is associated with a preset amount of virtual coins, and wherein different types of game correspond to different preset amounts of virtual coins; and
   initiating an interactive game between the viewer and a streamer based on the second interaction instruction, wherein the streamer is any live streamer comprising the first streamer or the second streamer.

6. The method of claim 5, further comprising:
   acquiring an interactive action performed by the streamer;
   determining a game verification result based on the interactive action of the streamer and a preset action corresponding to the second interaction instruction; and
   determining whether to allocate the preset amount of virtual coins between the viewer and the streamer based on the game verification result.

7. The method of claim 6, further comprising:
   causing to allocate the preset amount of virtual coins between the viewer and the streamer in response to determining that the interactive action of the streamer is consistent with the preset action, wherein the allocating the preset amount of virtual coins further comprises deducting the preset amount of virtual coins from the viewer's total virtual coins and adding the preset amount of virtual coins into the streamer's total virtual coins.

8. A system of implementing interactions among live streamers and viewers, comprising:
   at least one processor; and
   at least one memory communicatively coupled to the at least one processor and comprising computer-readable instructions that upon execution by the at least one processor cause the at least one processor to perform operations comprising:
   in response to receiving an interaction request from a first client computing device associated with a first streamer, establishing a connection between the first client computing device and a second client computing device associated with a second streamer based on the interaction request;
   obtaining a first video stream from the first client computing device and obtaining a second video stream from the second client computing device;
   generating an interactive video stream, the interactive video stream comprising the first video stream and the second video stream;
   sending the interactive video stream to a third client computing device associated with a viewer, wherein the viewer is any viewer of the interactive video stream;
   detecting whether information is received from the third client computing device associated with the viewer, wherein the information comprises an interaction instruction from the viewer;
   determining whether the interaction instruction is associated with the first video stream or the second video stream based on the information received from the third client computing device;

in response to determining that the interaction instruction is associated with the first video stream, causing to render the first video stream based on the interaction instruction; and in response to determining that the interaction instruction is associated with the second video stream, causing to render the second video stream based on the interaction instruction.

9. The system of claim 8, wherein the interaction request comprises information indicating a type of a game and information indicating the second streamer with whom the first streamer will compete in the game.

10. The system of claim 8, the operations further comprising:
determining a preset rendering effect corresponding to the interaction instruction using a preset rendering effect library, wherein the preset rendering effect library comprises a plurality of preset rendering effects configured to adjust difficulties of games; and
applying the preset rendering effect to the first video stream or the second video stream, wherein the interaction instruction is indicative of decreasing or increasing a difficulty of a game in which the first streamer and the second streamer are competing, and wherein the preset rendering effect is configured to decrease or increase the difficulty of the game.

11. The system of claim 8, the operations further comprising:
obtaining a third video stream by causing to render one of the first video stream or the second video stream based on the interaction instruction;
generating a target interactive video stream by splicing the third video and another among the second video stream or the first video stream; and
pushing the target interactive video stream to the third computing device associated with the viewer for display.

12. The system of claim 8, the operations further comprising
acquiring a second interaction instruction sent from the viewer, wherein the second interaction instruction is associated with a preset amount of virtual coins, and wherein different types of game correspond to different preset amounts of virtual coins; and
initiating an interactive game between the viewer and a streamer based on the second interaction instruction, wherein the streamer is any live streamer comprising the first streamer or the second streamer.

13. The system of claim 12, the operations further comprising:
acquiring an interactive action performed by the streamer;
determining a game verification result based on the interactive action of the streamer and a preset action corresponding to the second interaction instruction; and
determining whether to allocate the preset amount of virtual coins between the viewer and the streamer based on the game verification result.

14. The system of claim 13, the operations further comprising:
causing to allocate the preset amount of virtual coins between the viewer and the streamer in response to determining that the interactive action of the streamer is consistent with the preset action, wherein the allocating the preset amount of virtual coins further comprises deducting the preset amount of virtual coins from the viewer's total virtual coins and adding the preset amount of virtual coins into the streamer's total virtual coins.

15. A non-transitory computer-readable storage medium, storing computer-readable instructions that upon execution by a processor cause the processor to implement operations comprising:
in response to receiving an interaction request from a first client computing device associated with a first streamer, establishing a connection between the first client computing device and a second client computing device associated with a second streamer based on the interaction request;
obtaining a first video stream from the first client computing device and obtaining a second video stream from the second client computing device;
generating an interactive video stream, the interactive video stream comprising the first video stream and the second video stream;
sending the interactive video stream to a third client computing device associated with a viewer, wherein the viewer is any viewer of the interactive video stream;
detecting whether information is received from the third client computing device associated with the viewer, wherein the information comprises an interaction instruction from the viewer;
determining whether the interaction instruction is associated with the first video stream or the second video stream based on the information received from the third client computing device;
in response to determining that the interaction instruction is associated with the first video stream, causing to render the first video stream based on the interaction instruction; and
in response to determining that the interaction instruction is associated with the second video stream, causing to render the second video stream based on the interaction instruction.

16. The non-transitory computer-readable storage medium of claim 15, wherein the interaction request comprises information indicating a type of a game and information indicating the second streamer with whom the first streamer will compete in the game.

17. The non-transitory computer-readable storage medium of claim 15, the operations further comprising:
determining a preset rendering effect corresponding to the interaction instruction using a preset rendering effect library, wherein the preset rendering effect library comprises a plurality of preset rendering effects configured to adjust difficulties of games; and
applying the preset rendering effect to the first video stream or the second video stream, wherein the interaction instruction is indicative of decreasing or increasing a difficulty of a game in which the first streamer and the second streamer are competing, and wherein the preset rendering effect is configured to decrease or increase the difficulty of the game.

18. The non-transitory computer-readable storage medium of claim 15, the operations further comprising:
obtaining a third video stream by causing to render one of the first video stream or the second video stream based on the interaction instruction;
generating a target interactive video stream by splicing the third video and another among the second video stream or the first video stream; and pushing the target interactive video stream to the third computing device associated with the viewer for display.

19. The non-transitory computer-readable storage medium of claim 15, the operations further comprising acquiring a second interaction instruction sent from the viewer, wherein the second interaction instruction is associated with a preset amount of virtual coins, and wherein different types of game correspond to different preset amounts of virtual coins; and initiating an interactive game between the viewer and a streamer based on the second interaction instruction, wherein the streamer is any live streamer comprising the first streamer or the second streamer.

20. The non-transitory computer-readable storage medium of claim 19, the operations further comprising:

acquiring an interactive action performed by the streamer;

determining a game verification result based on the interactive action of the streamer and a preset action corresponding to the second interaction instruction; and determining whether to allocate the preset amount of virtual coins between the viewer and the streamer based on the game verification result.

\* \* \* \* \*